(No Model.)  T. C. DEXTER.  6 Sheets—Sheet 2.
COLLATING MACHINE.

No. 588,635.  Patented Aug. 24, 1897.

Fig. 2

WITNESSES:
C. L. Bendixon
H. B. Smith

INVENTOR
Talbot C. Dexter
By E. Lang
his ATTORNEY (No Model.) 6 Sheets—Sheet 3.
T. C. DEXTER.
COLLATING MACHINE.

No. 588,635. Patented Aug. 24, 1897.

Fig. 3

WITNESSES:
C. L. Bendixen
H. B. Smith

INVENTOR
Talbot C. Dexter
By C. Laass
his ATTORNEY (No Model.) 6 Sheets—Sheet 4.

T. C. DEXTER.
COLLATING MACHINE.

No. 588,635. Patented Aug. 24, 1897.

Fig. 4.

WITNESSES:
C. L. Bendixen
H. B. Smith

INVENTOR
Talbot C. Dexter
By E. Laass
his ATTORNEY (No Model.) 6 Sheets—Sheet 5.

T. C. DEXTER.
COLLATING MACHINE.

No. 588,635. Patented Aug. 24, 1897.

WITNESSES:
C. L. Bendixon
H. B. Smith

INVENTOR
Talbot C. Dexter
By E. Laass
his ATTORNEY (No Model.) 6 Sheets—Sheet 6.

T. C. DEXTER.
COLLATING MACHINE.

No. 588,635. Patented Aug. 24, 1897.

WITNESSES:
C. L. Bendixon
H. B. Smith

INVENTOR:
Talbot C. Dexter
By E. Laass
his ATTORNEY

UNITED STATES PATENT OFFICE.

TALBOT C. DEXTER, OF PEARL RIVER, NEW YORK.

COLLATING-MACHINE.

SPECIFICATION forming part of Letters Patent No. 588,635, dated August 24, 1897.

Application filed May 27, 1896. Serial No. 593,269. (No model.)

*To all whom it may concern:*

Be it known that I, TALBOT C. DEXTER, of Pearl River, in the county of Rockland, in the State of New York, have invented new and useful Improvements in Collating-Machines, of which the following, taken in connection with the accompanying drawings, is a full, clear, and exact description.

This invention pertains to the class of machines which are designed to gather into proper consecutive order the several signatures composing a book to be bound.

The object of this present invention is to provide a machine with mechanisms which shall be automatically controlled in their actions, so as to insure accuracy in the gathering of the consecutive signatures; and to that end the invention consists in the novel construction and combination of the component parts of the gathering or collating machine, as hereinafter described, and pointed out in the claims.

In the annexed drawings, Fig. 9 is a sectional view showing the three-way cock in a different operative position.

Similar letters of reference indicate corresponding parts.

A A represent a plurality of hoppers, each of which is designed to contain a supply of one of the series of signatures required to form a book. The signatures in the successive hoppers are in consecutive order for the purpose hereinafter explained. These hoppers are mounted in a straight row across the top of the main frame A' of the collating-machine. A short distance from the front of each hopper is a pair of rollers B B, disposed side by side and axially at right angles to the line of delivery of the signatures from the hopper. These rollers are journaled in boxes B' B', which are mounted on suitable supports and sustained so as to allow them to yield laterally. Said supports are in this case represented in the form of brackets $a$ $a$, fixed to cross-bars $a'$, extending across the machine and secured to the top of the sides of the main frame A'. To each pair of oppositely-disposed brackets $a$ is secured a bar $b$, which passes freely through the lower portions of the boxes B' B', which ride on the horizontally-extending bases of the brackets.

By means of spiral springs $c$ $c$, surrounding the end portions of the bar $b$ and bearing on the sides of the boxes, the rollers are held normally in contact with each other. Said rollers are geared together, so as to cause them to revolve with their top portions toward each other, similar to the folding-rollers of paper-folding machines, and receive between them the signature, which is delivered to them from the hopper A by suitable means for taking the signature from the hopper and carrying it to the bite of the rollers.

My present invention is not limited to any specific construction of said delivering devices. As represented in the drawings, they consist of a main pneumatic suction-pipe C, connected to either a rotary fan D, as shown, or to an air-pump, as may be desired or convenient. To said main pipe are connected a plurality of flexible branches C' C', according to the number of hoppers A A. To each of these branches I prefer to attach two nozzles C" C", facing the discharge end of the hopper. To said nozzles is attached a rearwardly-extending horizontal bar E, which is reciprocated so as to carry the nozzles to the hopper A, where they suck the front signature therefrom, as hereinafter described, and carry said signature to a position over the bite of the rollers B B to deliver the signature thereto.

The bar E is supported on the upper ends of arms E' E' of equal lengths and secured at their lower ends on rock-shafts $b'$ $b'$, extending across the machine and journaled in suitable bearings on the sides of the frame A'. Each of the bars E is connected by a strap $c'$ to the upper end of a lever F, the lower end of which is held in contact with a rotary cam F' by a spring $c''$, which, in conjunction with said cam, imparts oscillatory motion to said lever.

Figure 8:
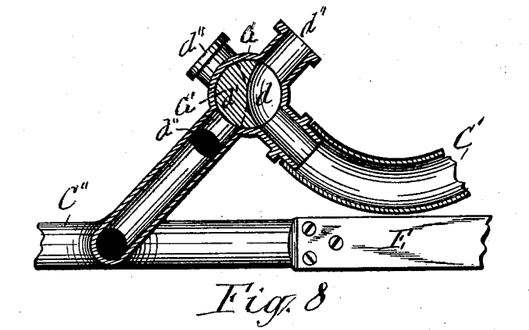
Fig. 8 is a longitudinal section on line Y Y in Fig. 7.
Figure 9:
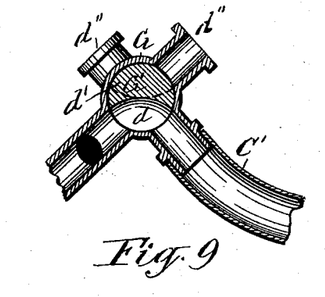
Figure 10:
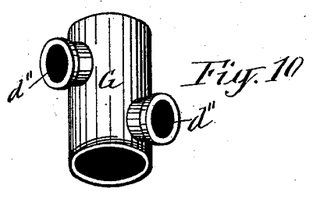
Fig. 10 is a detached perspective view of the valve-case of said three-way cock.
Figure 11:
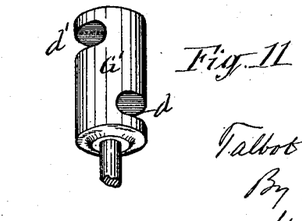
Fig. 11 is a perspective view of the valve.

In order to allow the nozzles C'' to suck the signature from the hopper and carry it to the rollers B B and then release the signature, so as to enter into the bite of the rollers, the said nozzles are provided at their junction with the hose C' with a three-way cock G, the valve G' of which is provided with two air-passages $d$ and $d'$, which are so arranged that when the valve G' is turned to a position to cause the passage $d$ to communicate with the hose C' and nozzle C'' the other passage $d'$ communicates with the two vents $d''$ $d''$, as shown in Fig. 9 of the drawings. This position of the valve causes the air to be drawn into the nozzles and enables the same to suck the signature from the hopper and carry it to the rollers B B. By turning the valve G' so as to cause the passage $d$ to open communication between the hose C' and one of the vents $d''$, as shown in Fig. 8 of the drawings, the passage $d'$ opens communication between the nozzles C'' and the other vent $d''$, as indicated by dotted lines. The valve is to be turned into this position when the nozzles C'' have carried the signature to the rollers. The inlet of air through the vent $d''$ into the nozzles causes the latter to release their holds on the signature.

In order to cause the three-way cock to be turned automatically in the manner aforesaid, I employ two tripping-fingers $e$ and $e'$, sustained in such positions as to cause them to come alternately in contact with a lever $e''$, attached to the valve-stem of the three-way cock, said contact being made in the approach of the nozzles to their two extreme positions, to which they are carried by the reciprocating bar E.

Figures 1, 12:
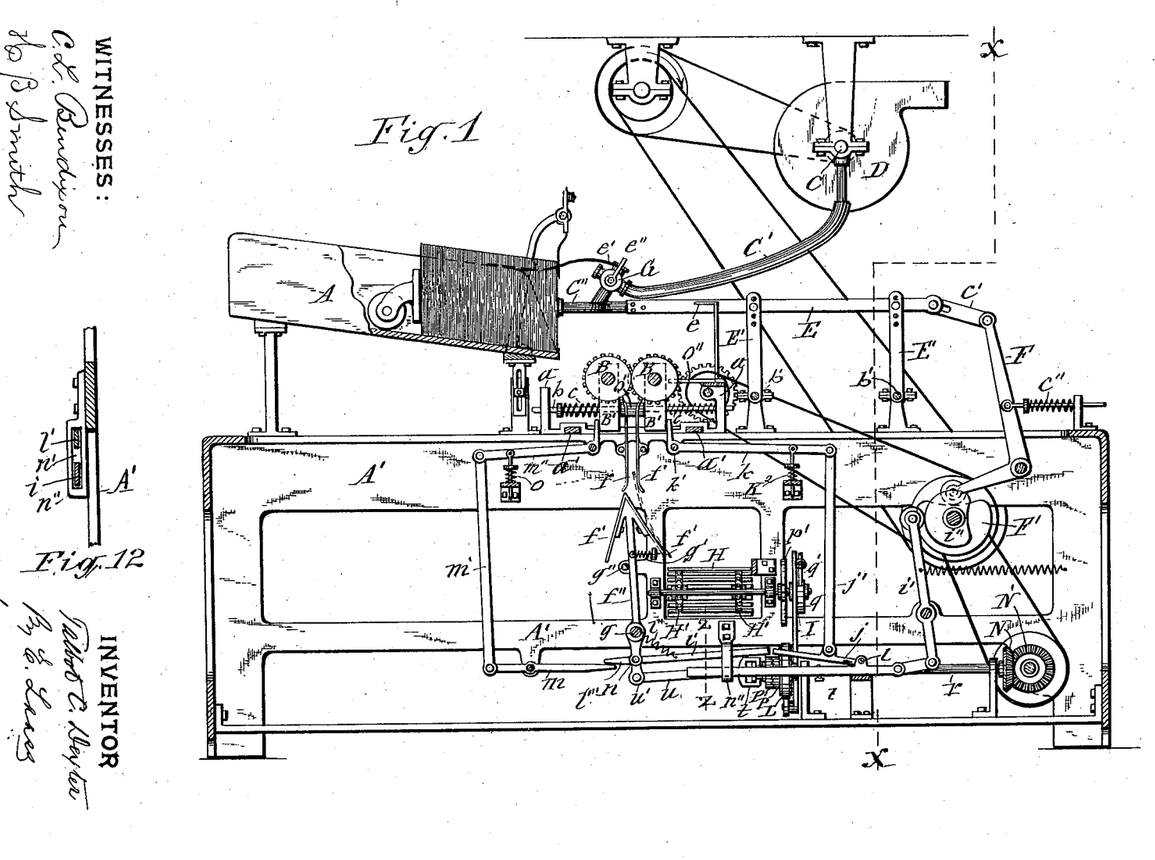
Figures 1 and 2 are vertical longitudinal sections taken immediately at the inner side of the collating-machine and showing the same in different operative positions.
Fig. 12 is an enlarged transverse section on line Z Z in Fig. 1.
Figure 2:
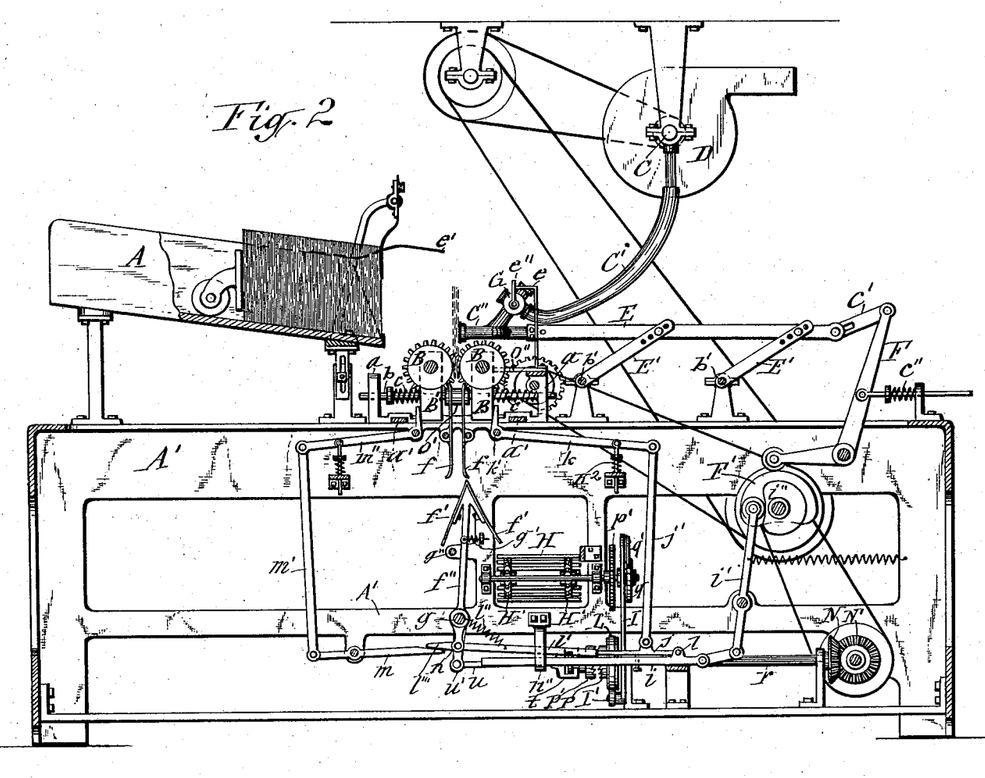
Figure 3:
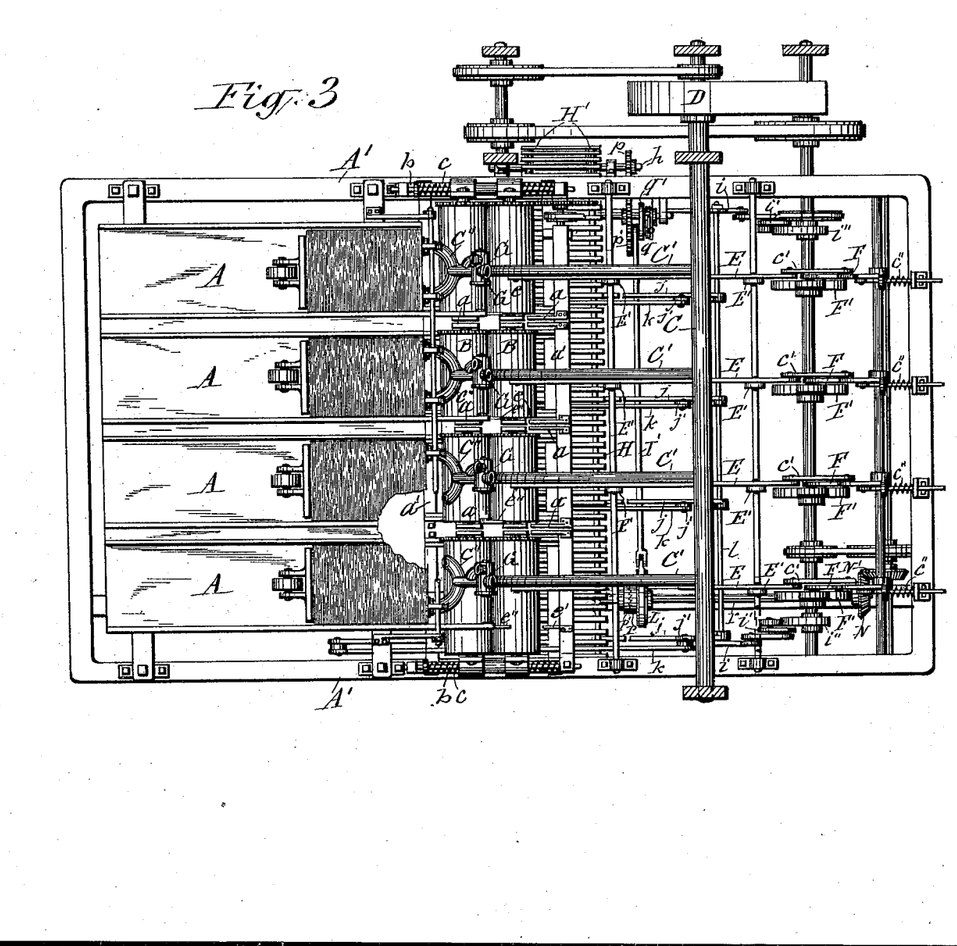
Fig. 3 is a plan view of the machine in the position represented in Fig. 1.
Figure 4:
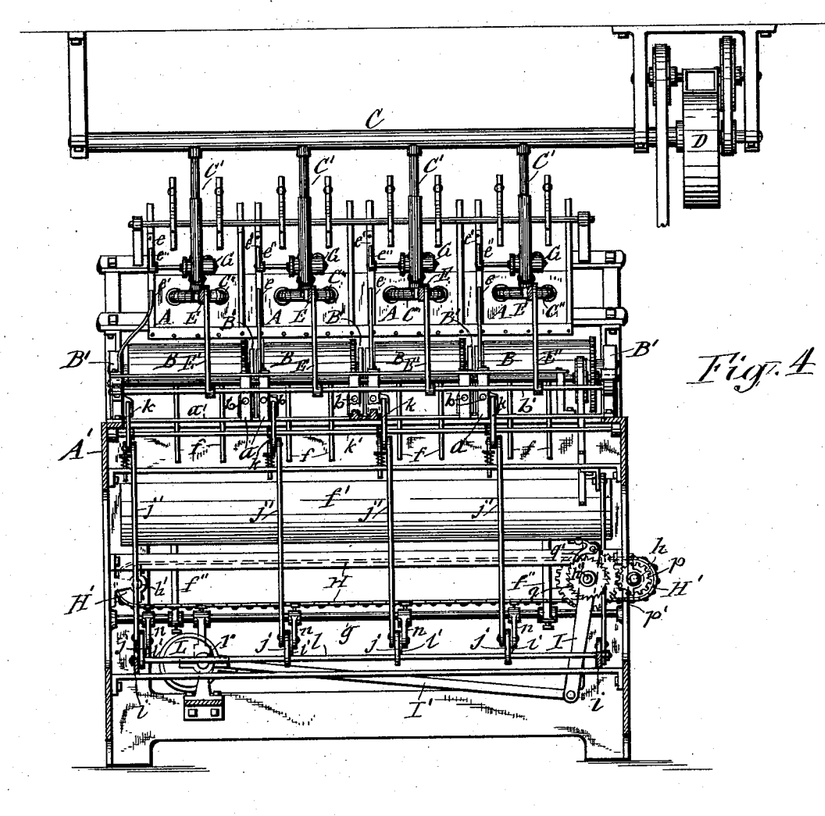
Fig. 4 is a vertical transverse section on line X X in Fig. 1.

Under the bite of the rollers B B are vertical guides $f f$, which receive between them the signature forced downward by said rollers, and beneath these guides are chutes $f'$ $f'$, attached to the upper end of posts $f''$, which are fastened to a shaft $g$, extending across the machine and pivoted to the frame thereof. Said chutes are inclined in opposite directions from the posts and extend under the entire series of rollers B. Suitable springs $g'$ force the posts to one side and against a stop $g''$ on the frame A', and when in this position one of the chutes $f'$ leads from the bites of the roller B to the signature-gathering carrier H, as illustrated in Fig. 1 of the drawings. Said carrier consists of endless chains or belts having attached to them transverse slats and running on wheels H', attached to transverse shafts $h$ $h'$ at opposite sides of the machine.

The carrier receives longitudinal movement by mechanisms hereinafter described. The salient features, however, of the invention reside in the mechanisms employed for automatically controlling the action of the described signature delivering and gathering devices, so that in case said devices fail to deliver simultaneously a single signature from each hopper A or deliver more than one signature at a time from one or more hoppers the delivering devices adjust themselves to prevent the delivered signatures from passing onto the gathering-carrier H, and as soon as the delivering devices have resumed their proper requisite operation to deliver from each hopper A a single signature said devices cause the signature to be conducted to the gathering-carrier. For this purpose I employ the laterally-yielding rollers B B, which act as normally-closed calipers opened automatically by the pressure of the signature passing through said calipers, and thus measuring the thickness of the signature in transit. In connection with these laterally-yielding rollers or calipers I employ suitable levers which are actuated by the lateral movement of said rollers or calipers and control the position of the chutes $f'$ $f'$ and the motion of the gathering-carrier H, so as to operate in harmony. The arrangements of said levers and their connections obviously admit of variations and modifications, and I therefore do not wish to be limited specifically to the following construction and combination of parts.

In a plane beneath the shaft $g$ and at right angles to said shaft are two horizontal pitmen $i$ $i$, preferably one at each side of the machine. Each of these pitmen receives intermittent reciprocating motion from a lever $i'$, which is pivoted to the frame A' and is connected at one end by a link or strap to the end of the pitman farthest from the shaft $g$. The opposite end of the lever $i'$ has pivoted to it a roller, by which it bears on a rotary cam $i''$ and thus receives oscillatory motion. On the two pitmen is pivoted a shaft $l$, to which are fastened the latches $j j$, which are connected by rods $j'$ to the ends of the long arms of bell-crank levers $k$ $k$, pivoted to a shaft $k'$, extending across the machine and mounted in bearings on the sides of the frame A'. The short arms of said bell-crank levers bear on the backs of one of the laterally-yielding journal-boxes B' of each pair, which support the rollers B B at one side of the bite of said rollers.

Inasmuch as all the latches $j$ are fastened to the same shaft $l$ it follows that all the levers $k$ move in unison. Suitable springs $K^2$ lift the long arms of the two bell-crank levers adjacent to the sides of the machine and thereby hold said levers in contact with the journal-box and normally lift the latches $j$.

The free ends of the latches $j$ face the free ends of a corresponding number of bars $l'$, pivoted to downwardly-projecting lugs $n$, fastened to the shaft $g$. Said ends of the bars play in vertical slots $n'$ in hangers $n''$, attached to the frame $A'$, as illustrated more clearly in Fig. 12 of the drawings. The lengths of said slots limit the vertical movements of the bars $l'$, which are held normally in elevated positions by springs $l''$, connected at one end to the shaft $g$ and at the opposite end to the bars some distance from the shaft.

The bar $l'$ is provided with a heel $l'''$, extending in opposite direction from the pivot of the bar, and under this heel lies the free end of a latch $m$, which is pivoted intermediate its length to the frame $A'$ and has the opposite end connected by a rod $m'$ to the long arm of a bell-crank lever $m''$, which is pivoted to the frame and has its short arm bearing on the side of one of the journal-boxes $B'$ of the roller $B$ nearest to the hopper $A$. The lever $m''$ is maintained in contact with the journal-box by means of a spring $o$ in a manner similar to the support of the other bell-crank lever $k$, hereinbefore described.

The spring $c$, which forces the journal-box $B'$ adjacent to the hopper to its normal position, is made stiffer than the spring $c$, which presses the opposite journal-box $B'$ to its normal position, and in order to prevent the aforesaid stiffer spring from pushing both journal-boxes laterally I interpose between said boxes a block $o'$, which is fastened to the rod or bar $b$ in any suitable manner. A stop $o''$ is attached to the bracket $a$ adjacent to the weaker spring $c$ to limit the lateral movement of the journal-box receiving the pressure of said spring.

The operations and effects of the levers $k$ and $m''$ are as follows: The springs $c\ c$ hold the rollers $B\ B$ normally in contact with each other, and when in this position the lever $k$ lifts the latch $j$, so as to cause the free end thereof to engage the end of the bar $l'$ during the reciprocating motion of the pitman $i$ and thereby turn the shaft $g$ so as to tilt the posts $f'''$ into a position which causes the chutes $f'$ to lead from the guides $f\ f$ away from the gathering-carrier $H$. When the suction-nozzles $C''$ bring a single signature to the rollers $B\ B$, the passage of said signature between the rollers causes the roller which is sustained by the weaker spring $c$ to yield laterally. This actuates the lever $k$ so as to cause it to depress the latch $j$, which is then allowed to slide under the bar $l'$ without disturbing it during the reciprocating motion of the pitman $i$. The spring $g'$ then throws the posts $f'''$ into a position to cause the chutes $f'$ to conduct the signature to the gathering-carrier $H$. To effect this, however, it is necessary that the entire series of levers $k$ be actuated to throw all the latches $j$ into the aforesaid position. Hence if either of the nozzles $C''$ fails to bring a signature from the hopper the posts $f'''$ remain in a position to cause the chutes $f'$ to guide the signatures from the gathering-carrier $H$, and said carrier only receives the signatures when all of the aforesaid nozzles have delivered simultaneously one of the signatures from the respective hoppers. In case one or more of said nozzles delivers two or more signatures simultaneously from one of the hoppers the excessive thickness of the signatures passing between the rollers $B\ B$ pushes aside the roller or rollers which are sustained by the stiffer spring $c$, while the stop or stops $o''$ prevent the companion roller or rollers from yielding to said pressure. This causes the lever $m''$ to press upward the heel $l'''$ of the bar $l'$ by means of the latch $m$, the tilting of which bar throws the same into a position to allow the depressed latch $j$ to abut against the end of the bar $l'$ during the motion of the pitman and thereby tilt the posts $f'''$ so as to cause the chutes $f'$ to guide the signatures from the gathering-carrier $H$. Hence it will be observed that the machine is so organized as to prevent the delivery of the signatures to the carrier $H$ in case more than one signature at a time is delivered from one of the hoppers.

Figure 5:
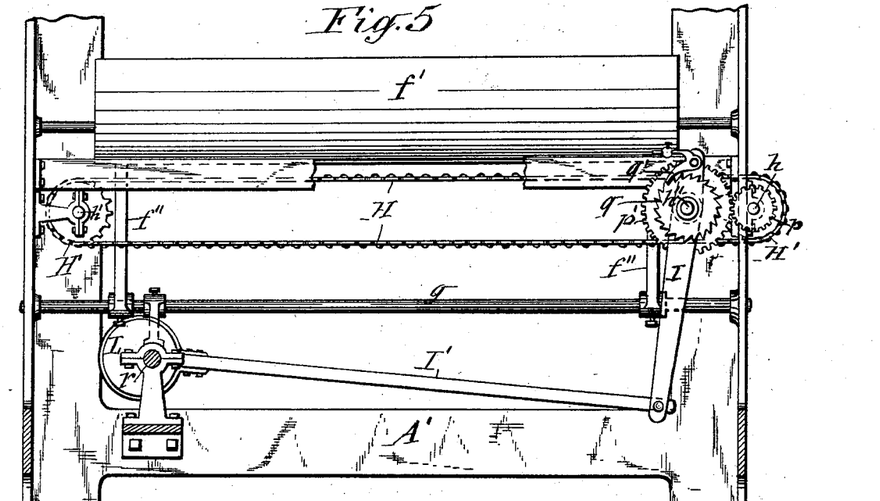
Fig. 5 is an enlarged elevation of the mechanism for imparting motion to the signature-gatherer.
Figure 6:
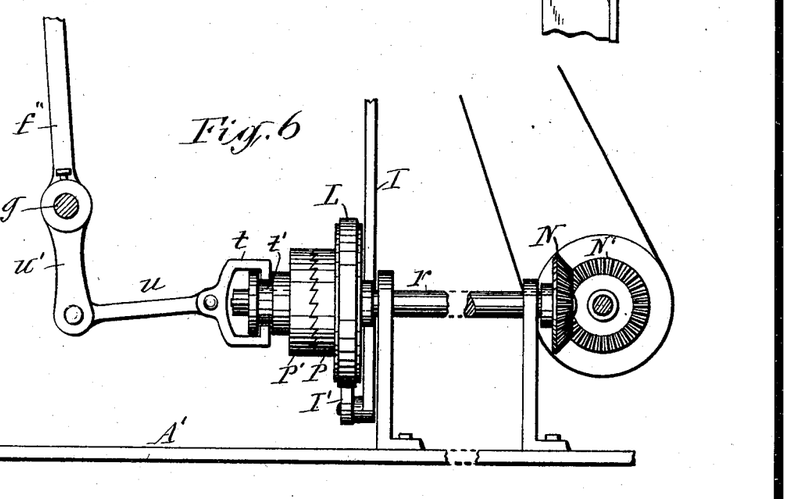
Fig. 6 is an enlarged view of the devices for automatically throwing in and out of gear the mechanism which imparts motion to said gatherer.
Figure 7:
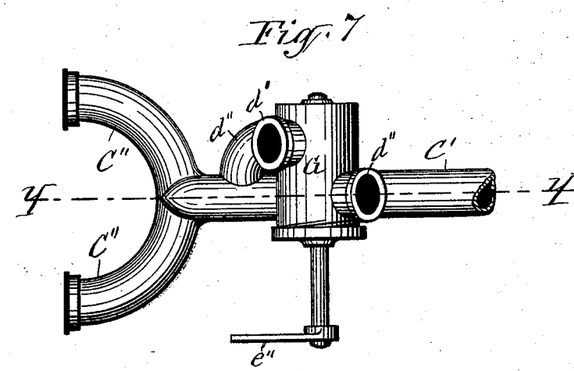
Fig. 7 is an enlarged plan view of one of the pneumatic suction-pipes which deliver the signatures from the hoppers.

In order to cause the movements of the carrier $H$ to be regulated automatically to conform to the aforesaid deliveries of the signatures, I employ the following mechanism: To one of the carrier-shafts $h$ is fastened a pinion $p$, which meshes with a gear-wheel $p'$, secured to a counter-shaft $h''$, to which is also fastened a ratchet-wheel $q$. A lever $I$ is fulcrumed on the counter-shaft $h''$ and has connected to it a pawl $q'$, which engages the said ratchet-wheel, as more clearly shown in Fig. 5 of the drawings. This lever receives oscillatory motion from a rod $I'$, connected to and reciprocated by a rotary eccentric $L$, mounted loosely on a shaft $r$, which, by means of suitable gears $N\ N'$ and suitable connections with the driving-shaft of the machine, receives positive rotary motion. To the eccentric is fastened one of the interlocking clutch members $P$. The companion member $P'$ is movable longitudinally on the shaft and caused to rotate therewith by spline-and-groove connection. A claw $t$ has a hold in a circumferential groove $t'$ in the hub of the clutch member $P'$ and is connected by a rod $u$ to the lower end of an arm $u'$, fastened to the shaft $g$, and therefore the two clutch members are caused to interlock when the posts $f'''$ are in a position to cause the chutes $f'$ to deliver the signatures to the carrier $H$, which receives motion from the eccentric $L$ by means of the rod $I'$, lever $I$, pawl $q'$, ratchet-wheel $q$, gear-wheel $p'$, and pinion $p$.

In case the posts $f'''$ are thrown into a position to guide the signatures from the gathering-carrier $H$ the turning of the shaft $g$ causes the arm $u'$ to draw the clutch member $P'$ out of its interlocked position, and consequently the motion of the eccentric is arrested and the motion of the carrier $H$ is thereby stopped.

It will thus be observed that all of the described gathering mechanisms operate in unison, so as to insure the gathering of the signatures in proper consecutive order ready for binding the same.

What I claim as my invention is—

1. A book-collating machine comprising a plurality of signature-hoppers, means for delivering the signatures successively from said hoppers, a carrier disposed to receive the signatures from the hoppers, normally-closed calipers in the path of the signatures to said carrier and opened automatically by the thickness of the signatures in transit through said calipers, guides sustained movably to convey the signature either to or from the carrier, and mechanisms actuated by the calipers and shifting the guides in their positions as set forth.

2. In combination with the plurality of signature-hoppers, signature-gathering carrier and means for delivering the signatures successively from the hoppers to said carrier, laterally-movable rollers disposed contiguously side by side, geared to revolve and arranged to receive between them the signatures in transit from the hoppers, signature-guides under said rollers and movable to carry the signatures either to or from the gatherer, actuating mechanisms adapted to shift said guides, and tripping mechanism actuated by the lateral movement of the aforesaid rollers and controlling the said actuating mechanisms.

3. In combination with the plurality of signature-hoppers, signature-gathering carrier and means for delivering the signatures successively from the hoppers to said carrier, positively-revolving rollers disposed contiguously side by side and arranged to receive between them the delivered signatures and journaled in laterally-yielding boxes, signature-guides under said rollers and movable to convey the signatures either to or from the gathering-carrier, actuating mechanisms adapted to shift said guides, tripping mechanism throwing the actuating mechanism in and out of operative connection with the guides, and levers actuated by the lateral motion of the aforesaid journal-boxes and controlling the action of the tripping mechanism as set forth.

4. In combination with the plurality of signature-hoppers, signature-gathering carrier and means for delivering the signatures successively from the hoppers to said carrier, rollers arranged to receive in their bites the signatures in transit to the carrier and sustained yieldingly lateral from each other, guides between said rollers and gathering-carrier and movable to convey the signatures either to or from said carrier and sustained normally in one direction, actuating mechanism for shifting said guides from their normal positions, and tripping mechanism actuated by the lateral movement of the aforesaid rollers and controlling the transmission of motion from said actuating mechanism to the guides as set forth.

5. In combination with the plurality of signature-hoppers, signature-gatherer and means for delivering the signatures successively from said hoppers, laterally-yielding rollers arranged to receive in their bites the delivered signatures, guides coupled together to move in unison for conveying the signatures either to or from the gatherer and held normally in one position, a positively-actuated pitman, a latch connected to said pitman and movable to engage and release the aforesaid guides, and levers actuated by the lateral movement of the aforesaid rollers and controlling the said latch as set forth.

6. In combination with the plurality of signature-hoppers, signature-gatherer and means for delivering the signatures successively from said hoppers, laterally-yielding rollers arranged to receive in their bite the delivered signatures, a shaft beneath said rollers and parallel therewith, posts fixed to said shaft and having on their upper ends chutes receiving the signatures from the rollers and extending respectively toward and from the gatherer, a spring and stop holding the free ends of said posts normally from the gatherer, a positively-actuated pitman, a latch connected to said pitman and normally out of position to actuate the posts, and levers actuated by the lateral movement of the aforesaid rollers and setting the latch into position to throw the aforesaid posts out of their said normal position as set forth.

7. In combination with the plurality of signature-hoppers, signature-gatherer and means for delivering the signatures successively from said hoppers, laterally-yielding rollers receiving in their bite the delivered signatures and having positive rotary motion to propel the signatures, guides between the rollers and gatherer and sustained normally to convey the signatures either to or from the gatherer, separate springs for resisting the lateral movement of each roller and of different tensions, a stop limiting the movement of the roller resisted by the weaker spring, separate levers actuated by the lateral movement of the respective rollers, a positively-actuated pitman, a latch connected to the pitman and movable to and from a position to shift the aforesaid guides and controlled by one of the aforesaid levers, a latch actuated by the other lever, and a tripping-bar between the two latches to be actuated thereby and transmit motion to the aforesaid signature-guides as set forth.

8. In combination with the signature-hoppers, means for delivering the signatures from said hoppers, laterally-movable journal-boxes, rollers journaled in said boxes and receiving the signatures from the hoppers, a shaft beneath said rollers and parallel therewith, posts fixed to said shaft and having chutes extending in opposite directions therefrom, an arm fastened to said shaft and a spring drawing the posts to one side, a tripping-bar pivoted to said arm, a spring supporting the aforesaid tripping-bar in its normal position, a positively-actuated pitman, a latch mounted on said pitman and facing one end of the tripping-bar and out of contact therewith when said bar is in its normal position, a latch adapted to throw the tripping-bar into position to be engaged by the latch of the pitman, and two levers actuated respectively by the lateral movements of the aforesaid journal-boxes and transmitting motion to the latches as and for the purpose shown and described.

9. In combination with the signature-hoppers, means for delivering the signatures from said hoppers, laterally-yielding rollers receiving in their bites the delivered signatures, a longitudinally-traveling gatherer, mechanism transmitting motion to said gatherer, a clutch adapted to throw said mechanism in and out of gear, signature-guides interposed between the aforesaid rollers and gatherer and movable to conduct the signatures either to or from the gatherer, levers actuated by the lateral movement of the rollers and controlling the positions of the aforesaid guides and mechanism transmitting motion from the guides to the aforesaid clutch as set forth.

In testimony whereof I have hereunto signed my name this 2d day of April, 1896.

TALBOT C. DEXTER. [L. S.]

Witnesses:
 JAS. F. WHETLOCK,
 V. E. MARSH.